Feb. 19, 1952  B. S. GERSON  2,586,528
BUSHING
Filed May 6, 1946

INVENTOR.
BENJAMIN S. GERSON
BY
ATTORNEYS

Patented Feb. 19, 1952

2,586,528

UNITED STATES PATENT OFFICE 2,586,528

BUSHING

Benjamin S. Gerson, Cleveland, Ohio, assignor to National Formetal Company, Cleveland, Ohio, a corporation of Ohio Application May 6, 1946, Serial No. 667,647

3 Claims. (Cl. 16—2)

This invention relates to inserts for die-castings and more particularly to bushings which are especially adapted for reinforcing openings in the walls of die-castings. Although die-castings have many advantages well known to those in the metal industries, their lack of strength and tendency to deformation due to internal stresses often make it necessary to employ inserts or bushings wherever force is to be applied or a wear part is to be used.

This invention is particularly directed to a bushing or liner for circular holes in die-castings, such as may be provided for the reception of a fixed bearing.

It has been known in the art to provide bushings for this purpose, but great difficulty has been experienced in securing a satisfactory bond between the bushing and the body of the die-casting. It early became apparent that scoring or roughing of the outer surface of the bushing was required, and knurling was resorted to as one of the most expeditious methods of obtaining such result. Various grid patterns involving parallel and intersecting channels have been tried, but in general, these prior art expedients have been unsatisfactory. In most cases, the bushings would loosen in the die-casting since the sharp edges formed on the bushing by knurling or other processes would tend to cut the die-cast metal under the application of thrust or torsion or the rapidly chilled die-cast metal would fail to fill the relatively deep sharp-edged grooves or interstices in the bushings. Another form of anchorage which has been resorted to with little success resided in a perforate or fabricated structure. This method was unsatisfactory since the die-cast metal would solidify as soon as it came into contact with the bushing and thus fail to form a dependable key.

This invention is based upon a discovery that by employing relatively widely spaced shallow indentations with gradually sloping walls, in the outer surface of the insert or bushing, a very strong and durable junction between the bushing and the die-cast metal may be obtained.

An object of the invention is to provide an insert or bushing for die-castings which will be most effectively retained by the casting.

Another object of the invention is to provide a bushing for die-castings provided with relatively shallow, small, widely spaced indentations in its outer surface to secure locking engagement with the die-cast metal.

A further object of the invention is to provide a bushing which is strong, and economical to manufacture, with precision and dispatch.

Other objects and advantages more or less ancillary to the foregoing and the manner in which all the various objects are realized will appear in the following description, which, considered in connection with the accompanying drawings, sets forth the preferred embodiment of the invention.

Referring to the drawings.

The bushing is preferably a cylinder 1 formed by rolling a strip of sheet metal, of appropriate gauge to secure the desired wall thickness and necessary rigidity, into a cylinder 1, the abutting ends of the strip constituting a seam 2. During the rolling process, indentations 3 are rolled in the surface of the strip which forms the outer surface of the bushing. These indentations are preferably arranged in a generally rectangular pattern of rows directed diagonally across the face of the bushing.

Figure 1:
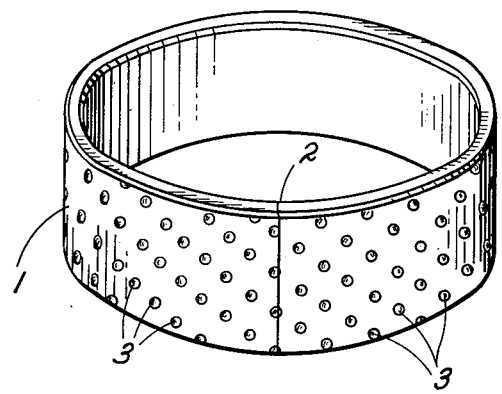
Fig. 1 is a view of a bushing in accordance with the invention.
Figure 3:
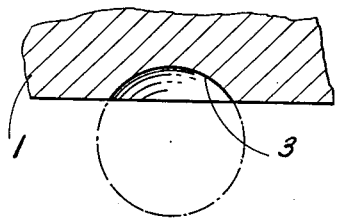
Fig. 3 is an enlarged view showing a cross-section of one of the indentations of the bushing.
Figure 2:
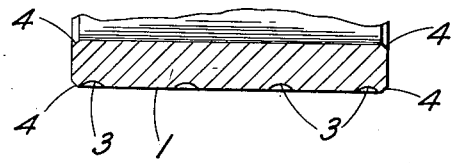
Fig. 2 is a cross section of the bushing.
Figure 4:
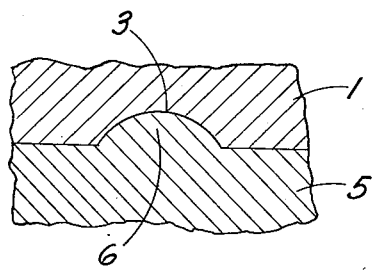
Fig. 4 is an enlarged cross-section through the bushing and the die-cast metal adjacent thereto.

Preferably the distance between the indentations in the diagonal rows is of the order of magnitude of the diameter of the indentations. The indentations may be conveniently formed by employing a roll having spherical bearing balls embedded therein and projecting slightly from its surface. The form of each indentation, illustrated in Fig. 3, is such as will be produced by forcing a sphere into the metal to a depth equal to approximately half the radius of the sphere. The edges of the bushing may be formed with a slight bevel 4 (Fig. 2).

Shaping of the bushing to precise cylindrical form and accurate radius is accomplished by a blanking and forming operation in dies designed for that purpose.

The significant features of the outer surface of the bushing according to the invention are that the indentations are widely spaced and occupy a relatively small portion of the surface, leaving a large flat cylindrical area in contact with the die-cast metal to afford better resistance to axial loads. The indentations are relatively shallow, their depth being of the order of one-third their diameter, assuring the flow of the die-cast metal therein. The walls of the indentation form an obtuse angle with the surface of the bushing, in order to facilitate the flow of metal therein, and eliminate the tendency of shearing of the projections 6 on the die-cast metal which enter the indentations.

The invention resides particularly in the conformation of the outer surface of the bushing, and not upon the shape of the bushing. Where circumstances require, the bushing may be tapered, or of a form other than circular. Furthermore, inserts of various shapes, which are not bushings, may have their surfaces prepared in accordance with the invention so that they will be retained more securely. It is to be understood that the word "ring" as used in the appended claims is intended to encompass a body of any configuration which is used as a reinforcing insert in a cast or molded part.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A bushing for lining openings in die-castings comprising a ring formed with a plurality of indentations in its outer surface, the indentations being of the form of a segment of a sphere of altitude substantially half the radius of the sphere.

2. A bushing for lining openings in die-castings comprising a ring formed with a plurality of indentations in its outer surface, the indentations being of the form of a segment of a sphere of altitude substantially half the radius of the sphere, the indentations being so spaced that more than half the area of the ring is free from indentation.

3. A bushing for lining openings in die-castings comprising a ring formed with a plurality of indentations in its outer surface, the indentations being of the form of a segment of a sphere of altitude substantially half the radius of the sphere, the indentations being spaced to provide a continuous land separating the indentations.

BENJAMIN S. GERSON.

REFERENCES CITED

The following references are of record in the file of this patent:

UNITED STATES PATENTS

| Number | Name | Date |
|---|---|---|
| 597,797 | Burke | Jan. 25, 1898 |
| 955,236 | Wells | Apr. 19, 1910 |
| 1,049,958 | Whiton | Jan. 7, 1913 |
| 1,419,171 | Read | June 13, 1922 |
| 1,753,434 | Klocke | Apr. 8, 1930 |
| 1,919,455 | Wilson | July 25, 1933 |
| 2,373,871 | Connor et al. | Apr. 17, 1945 |
| 2,425,611 | Frost et al. | Aug. 12, 1947 |

FOREIGN PATENTS

| Number | Country | Date |
|---|---|---|
| 385,059 | Great Britain | Dec. 22, 1932 |